(12) United States Patent
Chhabra et al.

(10) Patent No.: US 9,858,214 B2
(45) Date of Patent: Jan. 2, 2018

(54) TASK OFFLOAD TO A PERIPHERAL DEVICE

(71) Applicant: Microsoft Corporation, Redmond, WA (US)

(72) Inventors: Avnish Kumar Chhabra, Redmond, WA (US); Aditya Dube, Redmond, WA (US); Sanjay Kaniyar, Redmond, WA (US); James T. Pinkerton, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/896,132

(22) Filed: May 16, 2013

(65) Prior Publication Data

US 2013/0254436 A1   Sep. 26, 2013

Related U.S. Application Data

(63) Continuation of application No. 11/261,982, filed on Oct. 28, 2005, now Pat. No. 8,447,898.

(51) Int. Cl.
 *G06F 13/14* (2006.01)
 *H04L 29/06* (2006.01)
 *H04L 29/08* (2006.01)

(52) U.S. Cl.
 CPC .......... *G06F 13/14* (2013.01); *H04L 63/0485* (2013.01); *H04L 69/12* (2013.01);
 (Continued)

(58) Field of Classification Search
 CPC ... G06F 13/14; H04L 63/0485; H04L 63/164; H04L 69/12; H04L 69/22; H04L 69/32
 (Continued)

(56) References Cited

U.S. PATENT DOCUMENTS 5,937,169 A   8/1999   Connery
6,141,705 A   10/2000  Anand
(Continued)

OTHER PUBLICATIONS

Mogul, "TCP offload is a dump whose time has come", HP Lab, 20 pages, May 2003.
(Continued)

*Primary Examiner* — Henry Tsai
*Assistant Examiner* — John Roche
(74) *Attorney, Agent, or Firm* — L. Alan Collins; Collins & Collins Intellectual, LLC

(57) ABSTRACT

In one embodiment, to determine what tasks may be offloaded to a peripheral hardware device (e.g., to be performed in hardware on the peripheral device, rather than on the CPU(s) of the host computer), an indication from the at least one peripheral hardware device may be provided, without the peripheral hardware device first being queried to determine the task offload capabilities provided by the peripheral hardware device. In one embodiment, a large packet that includes a plurality of extension headers may be offloaded to the peripheral hardware device for segmentation. An indication of the offset where the extension headers end may be provided in connection with the large packet. In another embodiment, a packet with extension headers that come before an encryption header in the packet are not offloaded to peripheral hardware device for encryption, while packets with no extension headers before the encryption header may be offloaded.

20 Claims, 5 Drawing Sheets

(52) U.S. Cl.
CPC .............. *H04L 69/22* (2013.01); *H04L 69/32* (2013.01); *H04L 63/164* (2013.01)

(58) Field of Classification Search
USPC ............................................................ 710/5
See application file for complete search history.

(56) References Cited

U.S. PATENT DOCUMENTS

| | | | |
|---|---|---|---|
| 6,247,060 B1* | 6/2001 | Boucher et al. | 709/238 |
| 6,427,171 B1 | 7/2002 | Craft | |
| 6,530,061 B1 | 3/2003 | Labatte | |
| 6,993,644 B2 | 1/2006 | Anand | |
| 7,313,148 B2 | 12/2007 | Chu | |
| 7,424,710 B1 | 9/2008 | Nelson | |
| 7,656,894 B2 | 2/2010 | Dube | |
| 7,787,481 B1 | 8/2010 | Liang | |
| 2002/0003795 A1 | 1/2002 | Oskouy | |
| 2002/0016904 A1* | 2/2002 | Chrysanthakopoulos | 712/24 |
| 2002/0107903 A1 | 8/2002 | Richter | |
| 2003/0142629 A1 | 7/2003 | Krishnamurthi | |
| 2003/0200371 A1* | 10/2003 | Abujbara | 710/305 |
| 2003/0223466 A1 | 12/2003 | Noronha | |
| 2004/0062267 A1* | 4/2004 | Minami | H04L 12/5693 370/463 |
| 2004/0085904 A1 | 5/2004 | Bordogna | |
| 2004/0111485 A1* | 6/2004 | Mimatsu et al. | 709/213 |
| 2004/0158651 A1* | 8/2004 | Fan | H04L 29/06 710/1 |
| 2004/0264481 A1* | 12/2004 | Darling | H04L 29/06 370/401 |
| 2005/0089030 A1 | 4/2005 | Wilson | |
| 2005/0149632 A1 | 7/2005 | Minami | |
| 2005/0177387 A1* | 8/2005 | Mojsa | 705/1 |
| 2005/0198531 A1 | 9/2005 | Kaniz | |
| 2006/0034176 A1* | 2/2006 | Lindsay | 370/236 |
| 2006/0072564 A1 | 4/2006 | Cornett | |
| 2007/0022206 A1 | 1/2007 | Pope | |
| 2007/0025395 A1 | 2/2007 | Cardona | |
| 2007/0101023 A1 | 5/2007 | Chhabra | |
| 2008/0240131 A1* | 10/2008 | Sehgal | H04L 29/12547 370/401 |
| 2012/0005307 A1* | 1/2012 | Das et al. | 709/219 |

OTHER PUBLICATIONS

Microsoft, "Windows Network Task Offload", Dec. 4, 2001, p. 1. http://msdn.microsoft.com/en-us/windows/hardware/gg463469.
S. Deering (Cisco), R. Hinden (Nokia), "Internet Protocol, Version 6 Specification", Dec. 1998, Network Working Group, Request for Comments 2460.
U.S. Appl. No. 11/262,437, filed Oct. 28, 2005, Dube.
U.S. Appl. No. 11/261,982, filed Oct. 28, 2005, Chhabra.
U.S. Appl. No. 11/262,350, filed Oct. 28, 2005, Chhabra.

* cited by examiner

TASK OFFLOAD TO A PERIPHERAL DEVICE

RELATED APPLICATION

This application is a continuation of and claims benefit from U.S. patent application Ser. No. 11/261,982 that was filed on Oct. 28, 2005, and that is incorporated herein by reference in its entirety.

FIELD OF THE INVENTION

The present invention relates to increasing the efficiency of a computer system by offloading computational tasks to a peripheral device.

DESCRIPTION OF THE RELATED ART

Application programs that send and receive communications over a network are common. Such application programs include, for example, internet web browsers, e-mail programs, and many other types of application programs. Network application programs access the network using a layered approach, whereby the task of sending or receiving a data packet over the network is divided into a set of smaller tasks, whereby each smaller task may be performed by a layer, which may be implemented as hardware, software, or a combination thereof. The most basic function, such as putting data bits onto a network cable, are performed at the bottom layers, while functions attending to the details of applications are at the top layers. The purpose of each layer is to provide service to the layer(s) above it, so that the higher layer(s) need not be aware of how these services are actually implemented.

As shown in FIG. 1, to communicate over a network, application program 101 may pass data to be sent over the network to operating system 103 via an interface provided by the operating system. Operating system 103 may package the data in a form consistent with the underlying protocol by which the data will be sent over the network (e.g., TCP/IP) and pass the data to network interface card (NIC) 105. NIC 105 may then send the data over the network.

SUMMARY

This summary provides an illustrative context for aspects of the invention, in a simplified form. It is not intended to be used to determine the scope of the claimed subject matter, nor to identify key and/or essential features of the claimed subject matter.

Preparing data to be sent over a network may involve many computationally intensive tasks, such as calculating a checksum, segmenting a large data packet into smaller data packets, and encrypting a data packet. Because network interface cards sometimes have dedicated processors and memory, some of these computationally intensive tasks may be offloaded to the network interface card to ease the processing burden on the CPU of the host computer.

To accomplish the offloading of tasks to a network interface card, a network interface cards may announce to software on the host computer (e.g., the operating system) what tasks it is capable of performing. The software on the host computer may subsequently send data packets to the network interface card and request that the network interface card perform those tasks on the data packet prior to transmission.

If the capabilities of provided by the network interface card(s) change, the software on the host may be informed of this change so that it may take advantage of newly available offloading capabilities and/or may refrain from using task offloading capabilities that are no longer available.

Accordingly, one embodiment is directed to a method, in a computer system having at least one software component and at least one peripheral hardware device, comprising: receiving, at the at least one software component, an indication from the at least one peripheral hardware device of the task offloading capabilities of the at least one peripheral device, without the at least one software component initiating a query to determine the task offload capabilities of the peripheral hardware device. Another embodiment is directed to at least one computer readable medium encoded with instructions that, when executed in a computer system, perform the above-described method.

Another embodiment is directed to a method, in a computer system having at least one software component and at least one peripheral hardware device having at least one task offloading capability, comprising: sending a data packet from the at least one software component to the at least one peripheral device with an indication to the at least one peripheral device to perform the at least one task offloading capability on the data packet, without first sending a command to the at least one peripheral device to enable the at least one task offloading capability in the at least one peripheral device.

A further embodiment is directed to a method, in a computer system comprising at least one software component and at least one peripheral hardware device, of offloading segmentation of a large packet to the at least one peripheral device. The method comprises: sending the large packet from the at least one software component to the at least one peripheral device; sending, in connection with the large packet, an instruction, from the at least one software component to the at least one peripheral device, to segment the large packet into a plurality of smaller packets; and sending, in connection with the large packet, an indication of the length of the large packet, wherein the indication of the large packet is provided outside of the large packet.

Another embodiment is directed to a method, in a computer system comprising at least one software component and at least one peripheral hardware device, of offloading segmentation of a large packet to the at least one peripheral device. The method comprises: sending the large packet from the at least one software component to the at least one peripheral device, wherein the large packet includes a plurality of extension headers; sending, in connection with the large packet, an instruction, from the at least one software component to the at least one peripheral device, to segment the large packet into a plurality of smaller packets; and sending, in connection with the large packet, an indication of the offset in the large packet where the plurality of extension headers end.

A further embodiment is directed to a method, in a computer system comprising at least one software component and at least one peripheral hardware device, of offloading encryption of a packet to the at least one peripheral device. The method comprises: determining, at the at least one software component, whether the packet includes an extension header that comes before an encryption header in the packet; and when the packet does not include an extension header that comes before the encryption header, sending the packet from the at least one software component to the at least one peripheral hardware device with an instruction to the at least one peripheral hardware device to perform encryption on the packet.

Another embodiment is directed to a method, in a computer system having at least one software component and at least one peripheral hardware device, of performing task offload on a packet to be sent over a network. The method comprises: sending a large packet from the at least one software component to the at least one peripheral hardware device; and sending, in connection with the large packet, an instruction to perform segmentation and encryption of the large packet from the at least one software component to the at least one peripheral hardware device.

A further embodiment is directed to a method, in a computer system having at least one software component and at least one peripheral hardware device, of performing task offload on a packet to be sent over a network. The method comprises: sending a packet from the at least one software component to the at least one peripheral hardware device; and sending, in connection with the packet, an instruction to perform a checksum calculation and encryption of the packet from the at least one software component to the at least one peripheral hardware device.

Another embodiment is directed to a method, in a computer system having at least one software component and at least one network interface card, of conserving resources on the at least one network interface card. The method comprises: receiving, at the at least one network interface card, a plurality of security associations from the at least one software component, wherein each of the plurality of security association includes encryption parameters; storing the plurality of security associations in a memory on the at least one network interface card, and sending a request from the at least one network interface card to the at least one software component to not request encryption using at least one of the plurality of security associations, wherein the request is not sent in response to a communication received from the at least one software component.

A further embodiment is directed to a method, in a computer system comprising at least one software component and at least one peripheral hardware device, of offloading segmentation of a large packet to the at least one peripheral devices. The method comprises: sending the large packet from the at least one software component to the at least one peripheral device; sending, in connection with the large packet, an instruction, from the at least one software component to the at least one peripheral device, to segment the large packet into a plurality of smaller packets; and sending, in connection with the large packet, an indication of a starting identifier, segmenting, in the at least one peripheral device, the large packet to generate a sequence of smaller packets; assigning, in the at least one peripheral device, an identifier to each packet in the sequence of smaller packets, wherein a first packet in the sequence is assigned the starting identifier, wherein the identifier for each respective subsequent packet in the sequence is generated by incrementing the identifier assigned to the packet in the sequence that precedes the respective packet, and wherein when incrementing the identifier exceeds a predetermined threshold, the generation of identifiers wraps around to a predetermined initial identifier.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Applicants have appreciated that many of the tasks performed by on a data packet to prepare it for transport over the network are processor intensive. Such tasks include checksum computation and verification, encryption of data packets, segmentation of a data packet, and many other functions.

A checksum is a value that may be used by the receiver to verify the integrity of a data packet received over the network. The checksum value may be calculated by adding up the data elements of the packet and may be appended to the data packet prior to sending the data packet over the network. The receiver of the packet may then compare the appended checksum value to the data to verify that the packet data was not corrupted during transmission. Encryption of data packets involves transforming the message in the packet to deter unauthorized users from reading the contents of the message. Packet segmentation involves dividing large data packets up into smaller segments so that the packet size conforms to the maximum size permitted by the underlying network. For example, if the underlying network in an Ethernet network that allows a maximum packet size of 1514 bytes, a data packet of, for example, 128 Kb should be segmented into 1514 byte segments.

Many network interface cards are equipped with a dedicated processor and memory and thus may be capable of performing some or all of the tasks listed above. Thus, rather than having the processor of the host computer perform all of these tasks on a data packet, the performance of these tasks may be offloaded to the network interface card, which may employ its separate hardware to perform these tasks and alleviate the processing burden on the processor or processors (e.g., CPUs) of the host computer.

Figure 1:
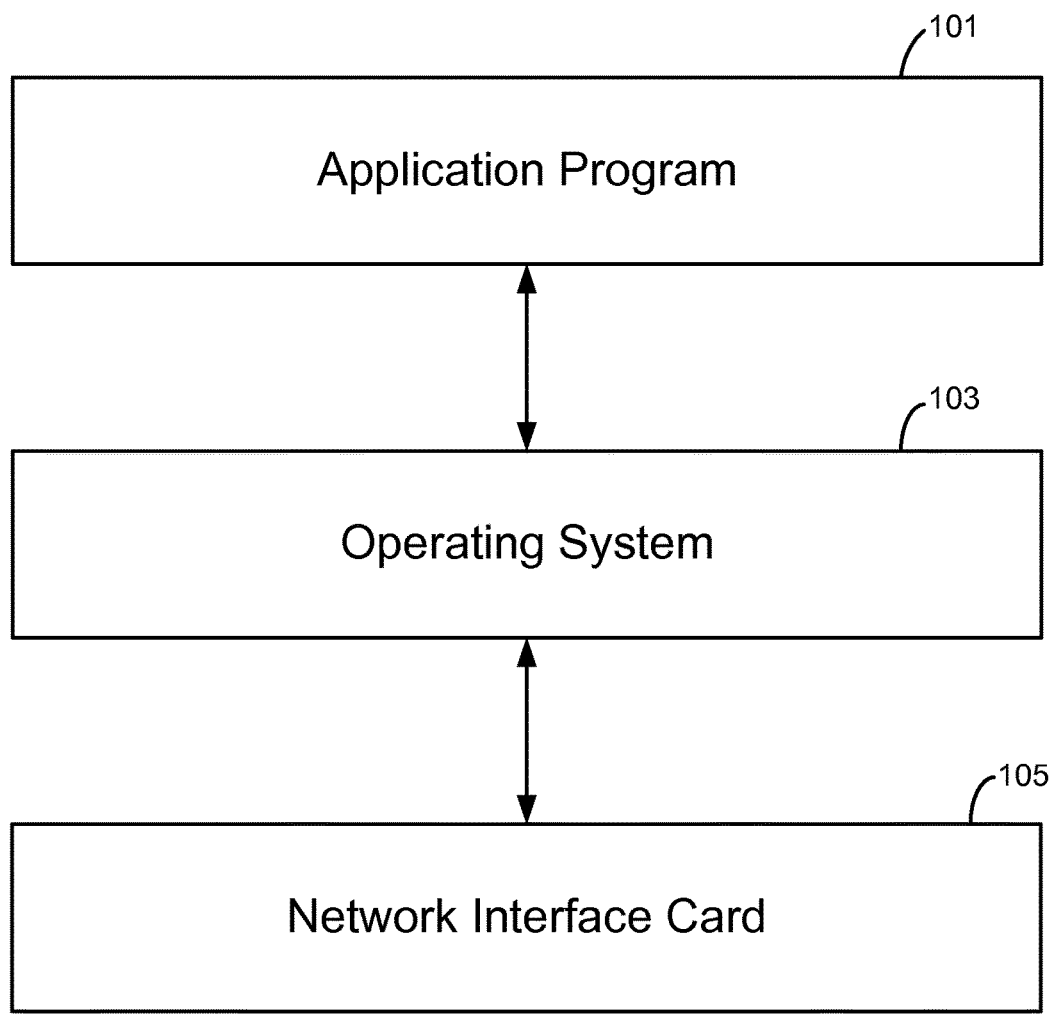
FIG. 1 is a block diagram of a layered approach by which an application program may transmit data over a network.
Figure 2:
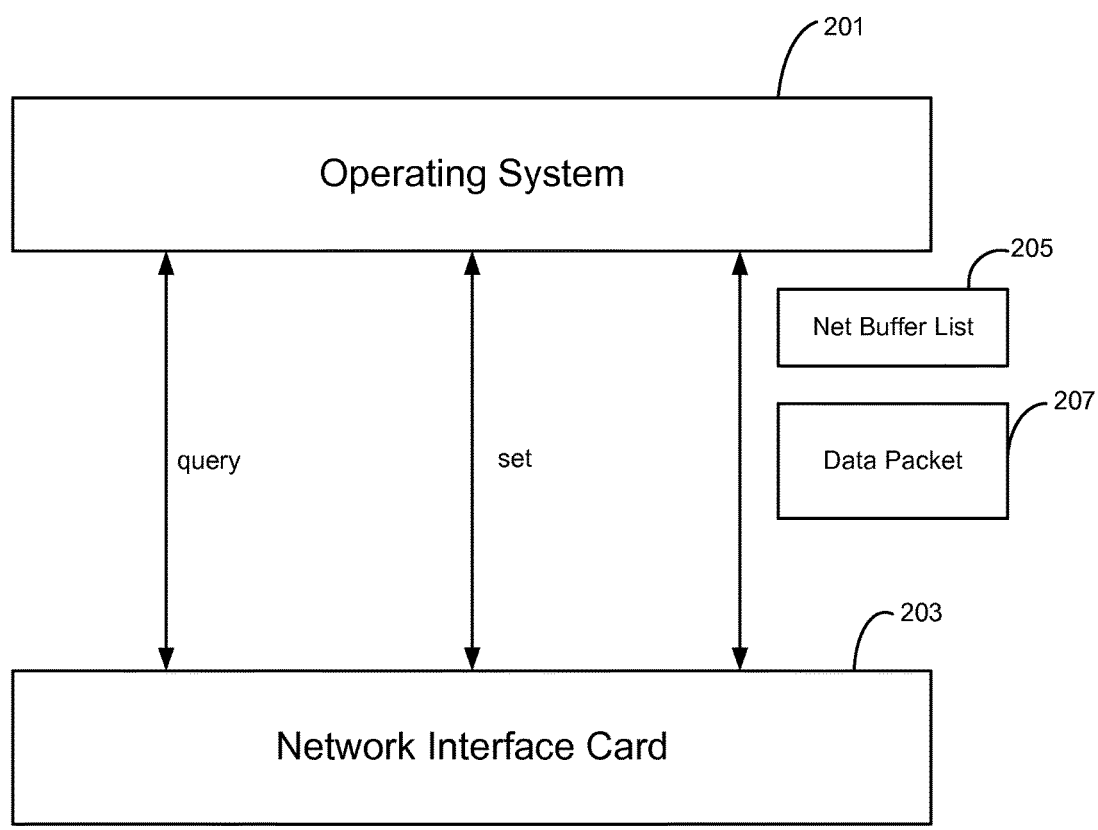
FIG. 2 is a block diagram of an operating system that may offload tasks to a network interface card.

FIG. 2 illustrates one example of a way in which processing tasks may be offloaded to a network interface card. When network interface card 203 is initially installed in a host computer and configured by the operating system 201 of the host computer, operating system 201 may query the network interface card to determine what tasks the network interface card is capable of performing and, consequently, what tasks may be offloaded to it. In response to the query, network interface card 203 may indicate to operating system 201 which offloading capabilities are supported. Operating system 201 may then determine whether any of the offloading capabilities supported by network interface card are useful to it and may send one or more set commands to network interface card 203 to enable the offloading capabilities in network interface card 203 that it may use in the future. That is, a set command is a command sent from operating system 201 to network interface card 203 to inform the network interface card of which of the network interface card's offloading capabilities may be used in the future.

When operating system 201 later desires to offload a task to network interface card 203, it may the send the data packet 207 on which the task is to be performed and its associated net buffer list 205 to network interface card 203. Net buffer list 205 includes metadata about the data in data packet 207 and may be used to indicate to network interface card 203 which tasks the operating system 201 has offloaded to network interface card 203 and, consequently, which tasks are to be performed by the network interface card 203. For example, the information in net buffer list 205 may indicate to network interface card 203 that the network interface card 203 should calculate the checksum of the data in data packet 207.

While the system illustrated in FIG. 2 allows tasks to be offloaded to network interface card 203, Applicants have appreciated that this system has several drawbacks. Specifically, the offload capabilities of the network interface card 203 are only determined once, when the initial binding between a particular protocol and network adapter is made. Binding allows two bound network components to communicate with each other. Thus, when a binding between a network interface card and a particular protocol is created, then the network adapter is able to communicate using that protocol. However, because the offload capabilities of a network interface card are determined only once (i.e., when the binding is established), if the offload capabilities of the network interface card change (e.g., if new capabilities become available or if previously available capabilities are no longer available), the operating system may not be able to use newly available capabilities and may attempt to use capabilities that are no longer available, thereby causing errors to occur and/or inefficiencies to be introduced into the system (e.g., if newly available capabilities are not used).

Further, the system illustrated in FIG. 2 may limit, for certain tasks, the ability to offload multiple tasks to be performed on the same data packet to the network interface card. The network interface card may not be capable of performing two tasks in combination because, for example, the information that the operating system typically provides to the network interface card for performing the second of the two tasks cannot be determined until after the first of the two tasks has been performed.

Additionally, in the system in FIG. 2, there is no way to specify to a network interface card which version of a particular protocol is being used. That is, for example, there are multiple versions of the Internet Protocol (IP). Because the extension headers differ between the different versions of the protocols, the algorithms to perform tasks on a packet formatted to conform to one version of the protocol differ from the algorithms to perform the same tasks on a packet formatter to conform to another version of the protocol. In the system of FIG. 2, there is no way to determine on which versions of a protocol the network interface card is capable of performing offloaded tasks. Further, even if the network interface card is capable of handling multiple different versions of protocol, there is no way to specify to which version of the protocol the packet being sent to the network interface card conforms.

In one embodiment, a system is provided in which the operating system may dynamically be made aware of changes in the capabilities of the network interface card or cards so that it may use newly available capabilities and may avoid attempting to use unavailable capabilities that were previously available. This may be done in any suitable way, as the invention is not limited in this respect.

Figure 3:
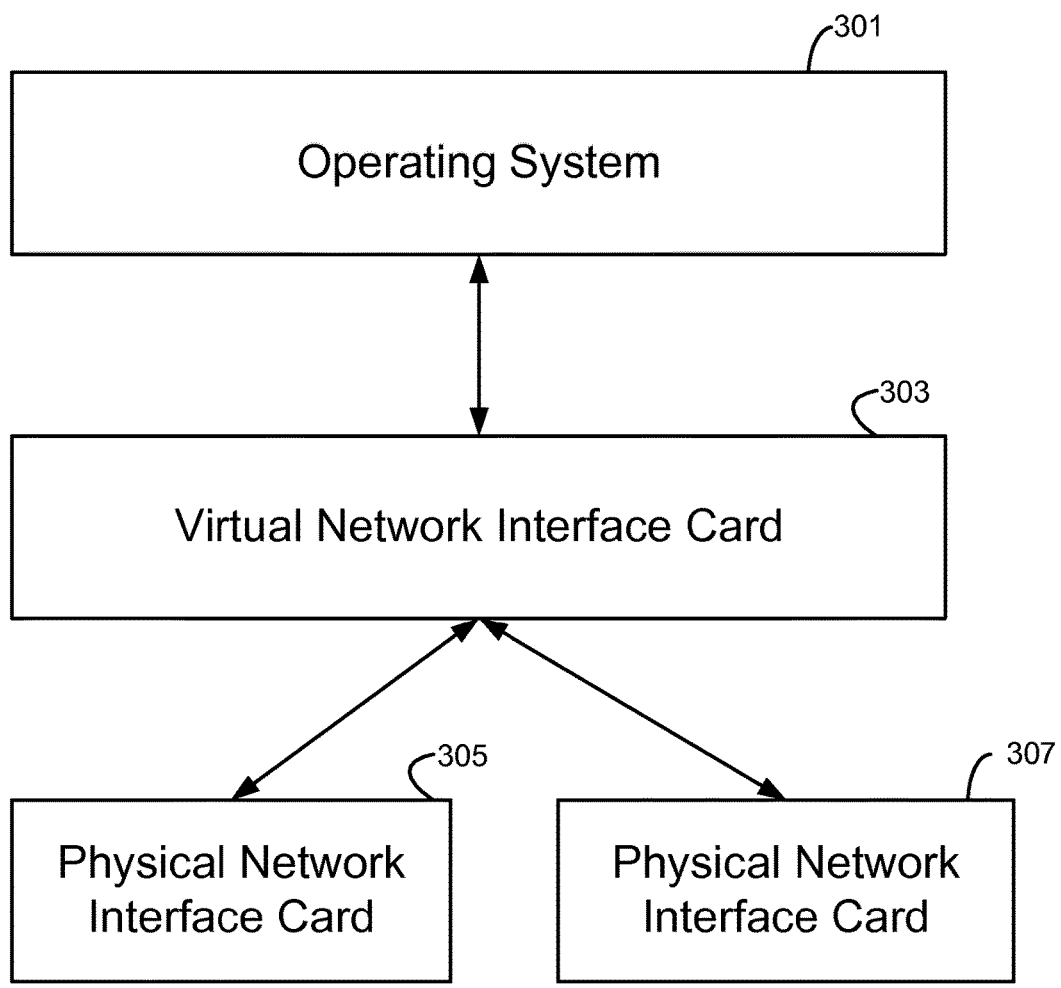
FIG. 3 is a block diagram of an example of a system having three physical network interface cards, on which embodiments of the invention may be implemented.

Changes in the offload capabilities of the network interface cards of a system may occur in numerous ways. For example, as shown in FIG. 3, operating system 301 communicates through virtual network interface card 303 with physical network interface card 305 and physical network interface card 307. The system may have multiple physical network interface cards for many reasons. For example, a system with multiple physical network interface cards provides a fault tolerant solution, such that if one network interface card fails, the system may remain operational by using the working network interface card.

Virtual network interface card 303 is a device driver that provides a common interface for operating system 301 and physical network interface cards 305 and 307. That is, virtual network interface card 303 may receive communications from operating system 301 and forward these communications to either physical network interface card 305 or physical network interface card 307. Virtual network interface card 303 may also determine whether a packet should be sent to physical network interface card 305 or physical network interface card 307. This determination may be in made in any suitable way, as the invention is not limited in this respect. For example, virtual network interface card 303 may select the physical network interface card to which to send a packet based on the offloaded tasks that are to be performed on the packet and the offloading capabilities of each physical network interface card. Alternatively, virtual network interface card 303 may use a round-robin or other load balancing scheme to select the physical network interface card to which to send a packet.

In one embodiment, physical network interface card 305 and physical network interface card 307 may provide different offloading capabilities from each other. For example, physical network interface card 305 may have the capability to perform checksum calculation and verification, while physical network interface card 307 may have the capability to perform segmentation of large packets. From the perspective of operating system 301, the virtual network interface card 303 with which it communicates has the capability to perform both checksum calculation and verification and segmentation of large packets. Thus, for example, when operating system 301 sends a data packet to virtual network interface card 303 and requests that the virtual network interface card perform checksum calculation on the packet, the virtual network interface card may send the packet to physical network interface card 305 and request that physical network interface card 305 perform checksum calculation prior to sending the packet. Similarly, when operating system 301 sends a data packet to the virtual network interface card 303 and requests that the virtual network interface card perform large packet segmentation on the data packet, the virtual network interface card may send the packet to physical network interface card 307 and request that physical network interface card 307 perform segmentation on the packet.

Figure 4:
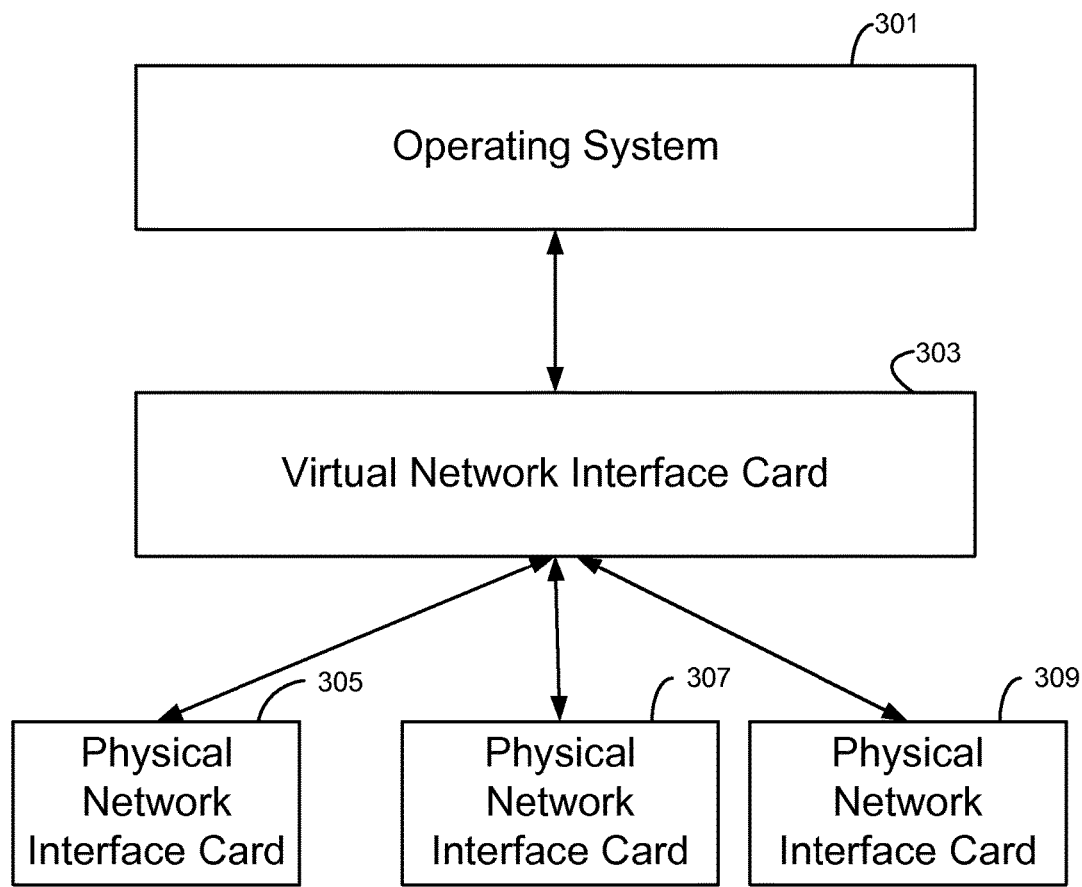
FIG. 4 is a block diagram of an example of a system having two physical network interface cards, on which embodiments of the invention may be implemented.

If one of the physical network interface cards fails, then the offloading capability provided by that physical network interface card is no longer available in the system and the offloading capabilities of virtual network interface 303 card have changed. For example, if physical network card 307 fails, virtual network interface card 303 can no longer provide large segmentation offloading. Further, the offloading capabilities may change if an additional physical network interface card is added to the system. For example, as shown in FIG. 4, physical network interface card 309 is added to the system and provides encryption offloading capability. Thus, the offloading capabilities of the virtual network interface card have changed as the virtual network interface card now has the capability to provide checksum offloading (via physical network interface card 305), large packet segmentation offloading (via physical network interface card 307), and encryption offloading (via physical network interface card 309).

In the examples above, each physical network interface card provided the capability to perform only a single offloaded task. However, the invention is not limited in this respect as each physical network interface card may provide the capability to perform multiple offloaded tasks. For example, in one embodiment, the system may include a physical network interface card 305 that is capable of performing offloaded checksum calculation, offloaded large packet segmentation, and offloaded packet encryption.

In another embodiment, the virtual network interface card may inform the operating system only of the offloading capabilities that are common to all of the underlying physical network interface cards. For example, if a first physical network interface card in the system provides the capability to perform packet encryption and large packet segmentation and a second physical network card in the system provides only the capability to perform large packet segmentation, then the virtual network interface card may inform the operating system that the only offloading capability available is large segmentation offload. If a third physical network interface card that does not provide any offloading capabilities is later added to the system, then virtual network interface card may inform the operating system that no task offloading capabilities are available.

Further, the example of FIG. 3 shows a system that has two physical network interface cards and the example of FIG. 4 shows a system that has three physical network interface cards. However, the invention is not limited to a system that has multiple network interface cards, as the invention may be used in conjunction with a system that has only a single physical network interface cards. Indeed, the invention may be used in conjunction with a system that has any suitable number of physical network interface cards (including systems that have four or more physical network interface cards).

In one embodiment, rather than employing a technique whereby the operating system queries the virtual network interface card to determine what offloading capabilities are available, the virtual network interface card announces the offloading capabilities to the operating system. Thus, whenever the offloading capabilities of the virtual network interface card change, the virtual network interface card may announce the change to the operating system. Thus, the operating system is aware of the current offloading capabilities of the virtual network interface card and may use offloading capabilities that have been added to the system and may avoid attempting to use offloading capabilities that are no longer available.

Figure 5:
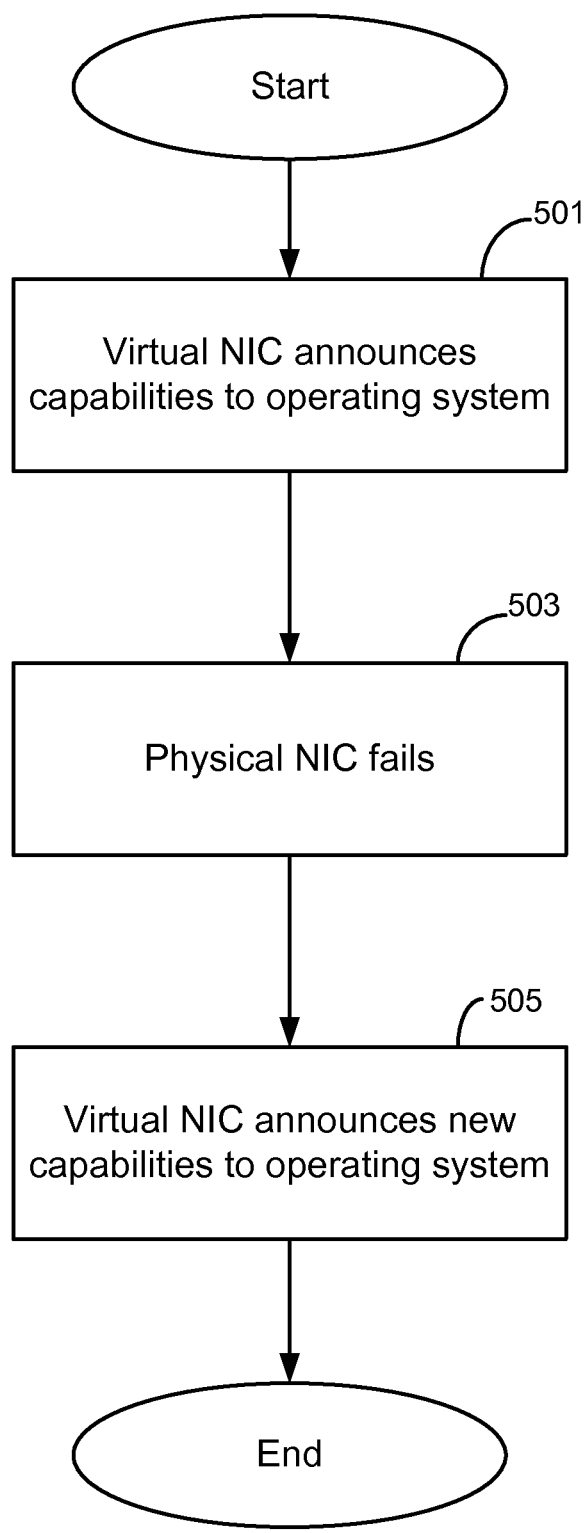
FIG. 5 is a flow chart of an example of a process by which offloading capabilities of a virtual network interface card may be indicated to an operating system, in accordance with one embodiment of the invention.

The flow chart of FIG. 5 is an example of a process by which a virtual network interface card may announce the available offloading capabilities to the operating system. At act 501, virtual network interface card may determine what offloading capabilities the physical network interface cards in the system provide and may inform the operating system of these capabilities. Thus, referring to the example of FIG. 3, virtual network interface card 303 may announce to operating system 301 that checksum calculation offloading and large packet segmentation offloading are available because physical network interface card 305 allows for checksum calculation offloading and physical network interface card 307 allows for large packet segmentation offloading. The process then continues to act 503 where the offloading capabilities of the system change. As discussed above, this may occur for numerous reasons, including, for example, the failure of a physical network interface card (e.g., due to hardware failure). For example, in FIG. 3, physical network interface card 307 may fail. Thus, the offloading capabilities of the system have changed because there is no longer an operational physical network card in the system that is capable of performing large packet segmentation. The process then continues to act 505 where the virtual network interface card may announce the new offloading capabilities of the system to the operating system. That is, continuing with the example of FIG. 3, because physical network interface card 307 is no longer operational, virtual network interface card 303 may announce to operating system 301 that the offloading capability available is checksum calculation. Accordingly, because operating system 301 has been informed of the new offloading capabilities, it will not attempt to offload a large packet segmentation task to virtual network interface card 303.

Virtual network interface card 303 may determine the offloading capabilities of the physical network interface cards in the system in any suitable way, as the invention is not limited in this respect. For example, virtual network interface card may initially query each physical network interface card as it is added to the system to determine its offloading capabilities and may maintain a record of the capabilities that are available. When a capability becomes unavailable (e.g., due to failure or removal of all the physical network cards that provide that capability) the virtual network interface card may remove that capability from the record of available capabilities.

As described above, when the operating system determines the offloading capabilities that are available in the system, it may issue a set command to enable the offloading capabilities of which it intends to make use. Applicants have appreciated that in embodiments where the virtual network interface card announces the available capabilities to the operating system, conflicts may occur, for example, when the virtual network interface card announces that a previously available capability is no longer available at the same time that the operating system issues a set command to enable use of the capability.

Thus, in one embodiment, no set command need be issued to enable one of the capabilities available in the system. Rather, all capabilities are treated as enabled-by-default. That is, all capabilities are always enabled. Of course, this does not mean that all offloading capabilities will be performed on every packet that is sent down. Rather, all offloading capabilities are available to be performed on every packet, should the operating system request that these offloading capabilities be performed. However, the operating system still has the ability to specify which specific tasks should be offloaded to the network interface card for each data packet.

When a packet is received by the network interface card, because the offloading capabilities are enabled by default, the network interface card may perform the offloaded task(s) when a packet is received. In one embodiment, the operating system may then receive the packet on which the offloaded task or tasks have been performed from the network interface card and may continue to process the packet. In another embodiment, the operating system may ignore the fact that network interface card has performed an offloaded task on the packet and may process the packet as if no offloaded task has yet been performed.

In the examples above, the operating system was considered the software entity that communicates with application programs to package application data into network packets, forward these network packets to a network interface card, and communicate with the network interface card (e.g., through a virtual network interface card) to offload computational tasks to the network interface card. It should be appreciated that many operating systems provide network services and the term operating system, as used herein, refers to the network services functionality that the operating system provides. An example of one network service, discussed above, that operating system may provide is receiving data from an application program and packaging the data in a form consistent with the underlying protocol by which the data is to be sent over the network. For example, the operating system may receive data from an application program and package the data with the appropriate headers and footers so that it may be sent according to a particular protocol (e.g., TCP/IP). However, the invention is not limited to use with an operating system that performs these functions. That is, the software that provides the network services used in conjunction with embodiments of the invention need not be an operating system, as any suitable software program may be used. For example, any software program capable of receiving application program data to be sent over a network and packaging the application program data to conform with a particular protocol may be used in place of the operating system and may perform all of the functions that are described herein as being performed herein by an operating system. It should be appreciated that this software program need not perform other functions unrelated to network communications that are typically performed by an operating system, such as, for example, certain memory management functions and certain file system management functions.

Tasks may be offloaded to a network interface card in any suitable way, as the invention is not limited in this respect. In one embodiment, a net buffer list may be provided with a data packet to be transmitted over the network. The net buffer list may include metadata about the data to be transmitted, may indicate which tasks are being offloaded to the network interface card, and may provide the information needed to perform the offloaded task or tasks to the network interface card.

For example, when a large packet segmentation is offloaded to a network interface card, the data packet to be segmented and a net buffer list may be provided the network interface card. The net buffer list may indicate which tasks the network interface card is to perform (in this case, large packet segmentation) and may also include information that the network interface card may use to perform the task. For example, the net buffer list may specify a maximum segment size (MSS) which indicates the maximum size for each segment into which the data packet is to be divided. The network interface card may then divide the data packet into segments based on the MSS. Then, for each segment, the network interface card may replicate the header information for the data packet and append the segment to the header information. The network interface card may then transmit the segment over the communication medium (e.g., the network cable).

In one embodiment, tasks to be performed on a network packet that is formatted according to version six of the Internet Protocol (hereinafter IPv6) may be offloaded the network interface card. For example, a large packet with IPv6 headers may be sent to the network interface card for large packet segmentation offload. In prior art network interface cards were capable of performing large segmentation offload for packets formatted according to version four of the Internet Protocol (hereinafter IPv4), the IPv4 packet header included a length field that indicated the size of the large packet. Such network interface cards would use this size field in determining how to divide the IPv4 packet into smaller IPv4 packets. However, the length field includes only 16 bits, thereby limiting the size of a large packet to only 64 kilobytes.

Accordingly, in one embodiment of the invention, rather than provide the length of the packet in the length field in the IP header, the length of the packet may be provided in the net buffer list that is sent to the network interface card along with the packet. The length field provided in the net buffer list may have any suitable number of bits and therefore may not be limited to indicating packet lengths of 64 kilobytes or any other size.

Applicants have also appreciated that in prior art network interface cards that performed segmentation of IPv4 packets, the IP header includes a 32-bit options field that may be used for tasks such as routing, fragmentation, and reassembly. To perform segmentation of an IPv4 packet, the packet data is divided into smaller packets and the IP header is replicated and placed and the beginning of each smaller packet. However, in IPv6, the IP header no longer includes an options field. The IPv4 options are replaced in IPv6 with extension headers which follow the IP header. IPv6 allows for any number of extension headers. Thus, unlike the fixed size of the IPv4 options field, in IPv6 the extension headers following the IP header may have any length.

Thus, in one embodiment, to perform large packet segmentation on an IPv6 packet, a network interface card may determine where the extension headers end and where the rest of the packet (e.g., the TCP header) starts, so that it may divide the rest of the packet into smaller packets, replicate the IP header and extension headers, and place these headers in each of the smaller packets.

The network interface card may determine where the extension headers end and where the TCP header begins in any suitable way. For example, in one embodiment, the offset of the TCP header in the IPv6 packet may be provided by the operating system to the network interface card in the net buffer list.

As another example, encryption tasks may be offloaded to the network interface card. This may be done in any suitable way, as the invention is not limited in this respect. For example, in one embodiment, IPSec Encapsulated Security Payload (ESP) encryption or IPSec Authentication Header (AH) may be used. The operating system may provide the network interface card with an unencrypted data packet and request that the network interface card perform IPSec encryption. The operating system may also indicate which encryption algorithm to use to encrypt the message data in the net buffer list. In one embodiment, the operating system may indicate which encryption algorithm to use and other encryption parameters, such as, for example, which key to use and which authentication format t use, in an IPSec Security Association (SA). The operating system may download SAs to the network interface card for later use. When the operating system later offloads an IPSec encryption task for a packet to the network interface card, the operating system may indicate which previously-downloaded (SA) the network interface card should use in performing the IPSec task. The operating system may indicate which SA to use in any suitable way, as the invention is not limited in this respect. In one embodiment, the operating system may specify the SA in the net buffer list that is provided with the packet. Thus, the network interface card may determine what SA to use via the net buffer list, encrypt the data, and insert the appropriate IPSec ESP information into the packet header.

Applicants have appreciated that some prior art network interface cards are capable of performing IPSec encryption tasks on IPv4 packets. However, Applicants recognize that for IPv4 packets that utilize the options field in the IP header, the contents of the packet may change from when the packet is sent to when the packet is received. For example, one option that may be used in the options field is a source-routing option that specifies the hops for the packet to go through to reach its final destination. Each router (i.e., hop) along the send path alters the options field of the IP header, so that what is sent out by the original router is different from what is received. Thus, to perform authentication on the packet (i.e., to verify that what was sent out is the same as what was received), the network interface card had to ignore the options field when performing authentication. Some network interface cards were incapable of performing IPSec tasks on IPv4 packets that utilized the options field. Thus, before offloading IPSec tasks to the network interface card, the operating system had to determine if the network interface card was capable of handling packets that utilized the IPv4 options field and what IPv4 options the network interface card could handle.

However, as mentioned above, in IPv4 the options field was limited to 32 bits, so there were only 32 possible options to be handled. With IPv6, the options field has been replaced by extension headers and the number of possible extension headers is unlimited. Thus, determining which extension headers the network interface card is capable of handling may present challenges, because of the number of possible extension headers is not limited and the fact that new extension headers are continually being created. Further, according to the IPv6 protocol, extension headers are to be processed in the order that they are located in the packet, because processing one extension header may alter the contents of a subsequent extension header.

Thus, in one embodiment of the invention, the operating system may not offload IPSec tasks for IPv6 packets to the network interface card if there are any extension headers in the packet that precede the IPSec header.

In another embodiment, rather than having the network interface card indicate which specific options it is capable of handling (as with IPv4 packets), the network interface card may indicate to the operating system a type of extension header that it is capable of processing. For example, the network interface card may indicate that it is capable of handling any extension headers that are formatted according to the type length value (TLV) format. Thus, if all the extension headers that precede the IPSec header in a packet are formatted according to the TLV format, then the operating system may offload IPSec tasks on the packet to the network interface card.

As mentioned above, the operating system may download SAs to the network interface card for later use in offloaded IPSec tasks. However, network interface cards have a limited amount of memory in which to store such SAs. In one embodiment of the invention, the network interface card may announce to the operating system that it is running low on free memory to store additional SAs. The network interface card may also or alternatively indicate that it is no longer capable of performing IPSec tasks using a particular SA and/or may request that the operating system delete that SA from the memory of the network interface card.

Applicants have appreciated that some network interface cards are capable of performing TCP connection offload. That is, the TCP state machine may be performed by the network processing, including the handling of TCP operations such as retransmits, timeouts, and acknowledgements. In such network interface cards, when a TCP connection is offloaded to the network interface card, the TCP and IP headers for a packet are generated by the network interface card. Thus, the IP ID field of the IP header of a packet whose TCP connection has been offloaded to the network interface card is generated by the network interface card.

However, the IP ID field of the IP header of a packet whose TCP connection has not been offloaded (i.e., the TCP state machine is performed by the operating system) is generated by the operating system. To ensure that duplicate IP IDs are not sent, for example if the operating system and the network interface card were to use the same IP ID in different packets, the IP ID namespace may be split. For example, the IP IDs generated by the operating system may always be between 0 and 32,767 while the IP IDs generated by the network interface card may always be between 32,768 and 65,536.

If the network interface card also performs large segmentation offload (i.e., in addition to TCP connection offload) and the network interface card is given one large packet to send that is to be segmented into 100 smaller packets, the operating system may provide a starting IP ID and instruct the network interface card to increment the starting IP ID successively by one to generate the IP IDs for each smaller packet after the first. However, if the starting IP ID provided to the network interface card is within 100 of 32,767, then the network interface card may generate IP IDs for some of the smaller packets that are greater than 32,767. These IP IDs may collide with other IP IDs generated by the network interface card for packets for which the TCP connection has been offloaded to the network interface card.

In one embodiment, to address this issue, the network interface card may be prevented from generating IP IDs greater than 32,767 for packets generated from the segmentation of large packet performed in connection with a large segmentation offload. Thus, for example, if the network interface card generates an IP ID of 32,767 for a smaller packet generated from a large packet segmentation and additional segmented packets remain that should be assigned IP IDs, the network interface card may wraparound the IP ID generation, such that the next packet is assigned an IP ID of 0. Thus, the network interface card does not use the entire available IP ID namespace (e.g., 0 to 65,536 in this example), but rather uses only a portion of this namespace to avoid collisions with IP IDs generated by the network interface card as part of a TCP connection offload.

In the examples above, the IP ID for a packet processed in connection with a large segment offload is between 0 and 32,767 and the IP ID for a packet processed in connection with a TCP connection offload is between 32.768 and 65,536. However, these ranges are merely provided as an example and any suitable ranges may be used, as the invention is not limited in this respect.

Further, in the examples above, the entire namespace for an IP ID is 0 to 65,536, however, the invention is not limited in this respect, as any suitable namespace may be used.

As discussed above, a limitation of prior art network interface cards is their inability to handle certain combinations of offloaded tasks. For example, prior art network interface cards may not be able to perform both IPSec encryption and large packet segmentation on the same data packet. This is because the information needed by the network interface card to perform IPSec encryption and to create the IPSec ESP headers for a packet depends on the IP header information for each packet. This information cannot be provided to the network interface card via the net buffer list because the operating system only has the header information for the large packet but does not yet know the header information for each segment (i.e., because the segmentation has not yet been performed).

In one embodiment, information may be provided in the net buffer list to allow the network interface card to determine the necessary IPSec ESP header information. That is, for example, the operating system may, in the net buffer list, indicate to the network interface card that it is offloading both the IPSec encryption task and large packet segmentation task. In addition, the operating system may provide information that allows the network interface card to compute the sequence number and padding for each segment.

That is, the IPSec header for each packet includes a sequence number that indicates the sequence of packets sent out. This sequence number may be used on the receiving end to verify that the packet has not been altered during transmission. However, when a large packet is sent to the network interface card for segmentation and IPSec encryption, the large packet has only a single sequence number and the network interface card must generate a sequence number in the IPSec header of each smaller packet after segmentation. In addition, the next packet that the operating system sends to the network interface card should have a sequence number that is the next number after the last number used by the network interface card in the smaller packet so that the operating system and the network interface card are synchronized with respect to the sequence numbers used.

Thus, in one embodiment, prior to sending the packet to the network interface card for large segmentation offload and IPSec offload, the operating system may determine how many smaller packets the network interface card is to generate from the large packet and may provide a range of sequence numbers for the network interface card to use in the IPSec header. For example, if the last packet sent down to the network interface card had the sequence number 10 and the large packet that is to be sent down to the network interface card is to be divided into five smaller packets, the operating system may indicate to the network interface card to use sequence numbers 11-15. This information may be provided in any suitable way, as the invention is not limited in this respect. For example, in one embodiment, the information may be provided in the net buffer list.

Applicants have appreciated that a particular IPSec SA may be valid for only a certain number of bytes of data. That is, once a certain number of bytes of data have been encrypted using a particular SA, the SA is no longer valid. Applicants have further appreciated that if the number of bytes encrypted using a particular SA is close to the total number of bytes that are permitted to be encrypted using the SA, the large segmentation may cause the encrypted number of bytes to exceed the total number of bytes that are permitted to be encrypted. This may be caused by the fact that the TCP header and the ESP header and trailer are encrypted when encrypted a packet using IPSec ESP and these headers and trailers need to be replicated and placed at the beginning of each smaller packet resulting from the segmentation of a large packet. For example, a particular SA may be valid for encrypting 5,000 more bytes. A large packet may include 4,500 bytes of data to be encrypted and is to be segmented into five smaller packets. Of the 4,500 bytes, 4,000 bytes may be payload data and 500 may be header data that is to be encrypted (e.g., the TCP header and/or the ESP header and trailer) and is to included in each smaller packet. As a result, each smaller packet resulting from the segmentation may have 800 bytes of payload data and 500 header bytes of data to be encrypted for a total of 1,300 bytes of data to be encrypted for each packet. As a result, because there are five smaller packets resulting from the segmentation, there are 6,500 bytes of total data to be encrypted. These 6,500 bytes exceed the 5,000 bytes that are valid for encrypting using that particular SA.

Thus, in one embodiment, the operating system may recognize that offloading a large packet to the network interface card for segmentation and IPSec encryption may result in an overflow the valid encryption bytes for a particular SA. If such an overflow would be caused, the operating system may not offload these tasks to the network interface card and may, for example, perform the segmentation and encryption in software.

Applicants have appreciated that when performing IPSec ESP encryption, an ESP trailer is placed at the end of the packet. The trailer includes authentication data and also includes padding to obfuscate the original length of the packet and to make the length of the packet a multiple of eight. The padding includes certain values that the receiver of the packet may use to verify that the packet has not been tampered with. When large packet segmentation and IPSec encryption are offloaded to the network interface card, the amount of padding to be placed in the ESP trailer in each smaller packet resulting from the segmentation must be the correct amount to make the length of each packet a multiple of eight.

Thus, in one embodiment, the operating system may indicate to the network interface card how much padding to put each smaller packet and what values are to be placed in each smaller packet. This may be done in any suitable way, as the invention is not limited in this respect. In one embodiment, this information may be provided to the network interface card in the net buffer list that is provided with the packet.

In another embodiment, the network interface card may be provided with the capability to perform both checksum calculation and IPsec encryption on the same data packet. This may be done in any suitable way as the invention is not limited in this respect. For example, the operating system may indicate to the network interface card, via the net buffer list, that is offloading the checksum calculation and IPSec encryption tasks. The network interface card may then perform these tasks on the data packet as a two pass process. That is, the network interface card may first calculate the checksum for the packet and append the checksum value to the packet. Then, the network interface card may perform IPsec encryption on the packet prior to transmission.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A host computer comprising:
   at least one processor;
   memory coupled to the at least one processor;
   an operating system configured to provide to a virtual network interface card a list that indicates particular tasks to be offloaded from the at least one processor to at least one of a plurality of hardware network interface cards;
   the plurality of hardware network interface cards; and
   the virtual network interface card configured to:
      maintain a record of available task offloading capabilities of the plurality of hardware network interface cards;
      provide the available task offloading capabilities to the operating system; and
      announce in an unsolicited manner the available task offloading capabilities to the operating system.

2. The host computer of claim 1 wherein the available task offloading capabilities comprise large packet segmentation offloading.

3. The host computer of claim 1 wherein the available task offloading capabilities comprise checksum calculation offloading.

4. The host computer of claim 1 wherein the virtual network interface card is further configured to remove a capability of the available task offloading capabilities from the record in response to the capability becoming unavailable from one of the plurality of hardware network interface cards.

5. The host computer of claim 1 wherein the virtual network interface card is further configured to announce in an unsolicited manner a change in the available task offloading capabilities to the operating system.

6. The host computer of claim 5 wherein the change is based on a failure of at least one of the plurality of hardware network interface cards.

7. The host computer of claim 1 wherein the announced available task offloading capabilities are common to all of the hardware network interface cards.

8. At least one computer-readable medium comprising:
   computer memory that comprises computer-executable instructions that, based on execution by at least one processor of a host computer that includes an operating system, a plurality of hardware network interface cards, and a virtual network interface card, configure the host computer to perform actions comprising:
      providing, by the operating system to the virtual network interface card, a list that indicates particular tasks to be offloaded from the at least one processor to at least one of the plurality of hardware network interface cards;
      maintaining, by the virtual network interface card, a record of available task offloading capabilities of the plurality of hardware network interface cards that the virtual network interface card provides to the operating system; and
      receiving, by the operating system from the virtual network interface card, an unsolicited announcement of at least one of the available task offloading capabilities.

9. The at least one computer-readable medium of claim 8 wherein the available task capability comprises large packet segmentation offloading.

10. The at least one computer-readable medium of claim 8 wherein the available task capability comprises checksum calculation offloading.

11. The at least one computer-readable medium of claim 8 wherein the virtual network interface card is configured to virtualize the plurality of hardware network interface cards.

12. The at least one computer-readable medium of claim 8 wherein the unsolicited announcement is in response to a change in the available task offloading capabilities.

13. The at least one computer-readable medium of claim 12 wherein the change is based on a failure of at least one of the plurality of hardware network interface cards.

14. The at least one computer-readable medium of claim 8 wherein the unsolicited announcement is in response to an additional hardware network interface card being added to the host computer.

15. A system comprising,
   at least one processor;
   memory coupled to the at least one processor;
   a plurality of hardware network interface cards;

a virtual network interface card configured to maintain a record of available task offloading capabilities of the plurality of hardware network interface cards; and an operating system configured to:
provide to the virtual network interface card a list that indicates particular tasks to be offloaded from the at least one processor to at least one of the plurality of hardware network interface cards; and
receive from the virtual network interface adapter an unsolicited announcement of at least one of the available task offloading capabilities.

16. The system of claim 15 wherein the available task available offloading capabilities comprise large packet segmentation offloading.

17. The system of claim 15 wherein the available task offloading capabilities comprise checksum calculation offloading.

18. The system of claim 15 wherein the unsolicited announcement is in response to a change in the available task offloading capabilities.

19. The system of claim 18 wherein the change is based on a failure of at least one of the plurality of hardware network interface cards.

20. The system of claim 15 wherein the at least one of the available task offloading capabilities of the received unsolicited announcement is common to all of the hardware network interface cards.

* * * * *